(12) United States Patent
Jin et al.

(10) Patent No.: US 12,504,099 B2
(45) Date of Patent: Dec. 23, 2025

(54) PIPE CLAMP ASSEMBLY AND HEAT EXCHANGER HAVING SAME

(71) Applicant: Danfoss A/S, Nordborg (DK)

(72) Inventors: Huan Jin, Zhejiang (CN); Yubao Liu, Zhejiang (CN)

(73) Assignee: DANFOSS A/S, Nordborg (DK)

( * ) Notice: Subject to any disclaimer, the term of this patent is extended or adjusted under 35 U.S.C. 154(b) by 136 days.

(21) Appl. No.: 18/559,196

(22) PCT Filed: May 13, 2022

(86) PCT No.: PCT/CN2022/092591
§ 371 (c)(1),
(2) Date: Nov. 6, 2023

(87) PCT Pub. No.: WO2022/242550
PCT Pub. Date: Nov. 24, 2022

(65) Prior Publication Data
US 2024/0229975 A1      Jul. 11, 2024

(30) Foreign Application Priority Data

May 21, 2021   (CN) .......................... 202121112860.6

(51) Int. Cl.
*F28F 9/02*     (2006.01)
*F16L 3/10*     (2006.01)
*F28F 9/06*     (2006.01)

(52) U.S. Cl.
CPC . *F16L 3/10* (2013.01); *F28F 9/06* (2013.01)

(58) Field of Classification Search
CPC ..................................... F16L 3/10; F28F 9/06
(Continued)

(56) References Cited

U.S. PATENT DOCUMENTS

| 2012/0153095 A1 | 6/2012 | Child et al. |
| 2018/0058763 A1 | 3/2018 | Wei |
| 2018/0320800 A1 | 11/2018 | Pieske et al. |

FOREIGN PATENT DOCUMENTS

| CN | 102648369 A | 8/2012 |
| CN | 203067448 U | 7/2013 |

(Continued)

OTHER PUBLICATIONS

International Search Report mailed on Jul. 15, 2022, in connection with corresponding International Application No. PCT/CN2022/092591 (7 pp., including machine-generated English translation).

*Primary Examiner* — Davis D Hwu
(74) *Attorney, Agent, or Firm* — McCormick, Paulding & Huber PLLC

(57) ABSTRACT

A pipe clamp assembly and a heat exchanger having same with the pipe clamp assembly including a first pipe clamp member and a second pipe clamp member. The first pipe clamp member includes a first mounting surface located on a first side of the first pipe clamp member, and a second mounting surface located on a second side, opposite the first side, of the first pipe clamp member, and the second pipe clamp member includes a mounting surface facing the first pipe clamp member, and the mounting surface of the second pipe clamp member and the second mounting surface of the first pipe clamp member are used for clamping a pipe between the mounting surface of the second pipe clamp member and the second mounting surface of the first pipe clamp member. By using the pipe clamp assembly and the heat exchanger, the risk of the inlet pipe and outlet pipe being scrapped due to puncturing from spot-welding and the risk of later failure due to damage to the inlet pipe and outlet pipe from spot-welding are both avoided, and the pipe clamp assembly and heat exchanger are simple to mount and easy to implement.

19 Claims, 13 Drawing Sheets

(58) Field of Classification Search
USPC .......................................................... 165/175
See application file for complete search history.

(56) References Cited

FOREIGN PATENT DOCUMENTS

| | | | |
|---|---|---|---|
| CN | 206291542 U | | 6/2017 |
| CN | 206738732 U | * | 12/2017 |
| CN | 208503662 U | | 2/2019 |
| CN | 215676632 U | | 1/2022 |
| JP | 2004108459 A | | 4/2004 |
| JP | 2006017204 A | | 1/2006 |
| JP | 2016035323 A | | 3/2016 |
| WO | WO2013058953 A1 | * | 4/2013 |

* cited by examiner

US 12,504,099 B2

PIPE CLAMP ASSEMBLY AND HEAT EXCHANGER HAVING SAME

CROSS-REFERENCE TO RELATED APPLICATIONS

This application is a National Stage application of International Patent Application No. PCT/CN2022/092591, filed on May 13, 2022, which claims priority to Chinese Patent Application No. 202121112860.6, filed on May 21, 2021, each of which is hereby incorporated by reference in its entirety.

TECHNICAL FIELD

The present invention relates to a pipe clamp assembly and a heat exchanger having same.

BACKGROUND

In a conventional heat exchanger comprising a first heat exchanger and a second heat exchanger, an inlet/outlet pipe of the second heat exchanger is connected to a manifold of the first heat exchanger by means of a support, and the support is respectively welded to the inlet/outlet pipe of the second heat exchanger and the manifold of the first heat exchanger by spot-welding.

SUMMARY

An object of the present invention is to provide a pipe clamp assembly and a heat exchanger having same, and thereby simplify the manufacturing process of a heat exchanger.

The present invention provides a pipe clamp assembly, comprising: a first pipe clamp member, the first pipe clamp member comprising a first mounting surface located on a first side of the first pipe clamp member, and a second mounting surface located on a second side, opposite the first side, of the first pipe clamp member; and a second pipe clamp member, the second pipe clamp member comprising a mounting surface facing the first pipe clamp member, and the mounting surface of the second pipe clamp member and the second mounting surface of the first pipe clamp member being used for clamping a pipe between the mounting surface of the second pipe clamp member and the second mounting surface of the first pipe clamp member.

According to an embodiment of the present invention, the first mounting surface of the first pipe clamp member is concave.

According to an embodiment of the present invention, at least a portion of the first mounting surface of the first pipe clamp member has an arc shape.

According to an embodiment of the present invention, the second mounting surface of the first pipe clamp member is concave, and the mounting surface of the second pipe clamp member is concave.

According to an embodiment of the present invention, at least a portion of the second mounting surface of the first pipe clamp member has an arc shape, and at least a portion of the mounting surface of the second pipe clamp member has an arc shape.

According to an embodiment of the present invention, the first pipe clamp member comprises a plurality of said first mounting surfaces, the first pipe clamp member further comprises an accommodating concave part located on the first side of the first pipe clamp member, and the accommodating concave part extends from an edge, in the arrangement direction of the plurality of first mounting surfaces, of the first pipe clamp member to one first mounting surface among the plurality of first mounting surfaces which is closest to the edge, to communicate with said one first mounting surface.

According to an embodiment of the present invention, the first pipe clamp member is a hollow component formed from a plate.

According to an embodiment of the present invention, the first pipe clamp member comprises a first plate which defines the first mounting surface, a second plate which defines the second mounting surface, and two third plates which are opposite each other and connected to the first plate and the second plate.

According to an embodiment of the present invention, the second pipe clamp member is a component formed from a plate.

According to an embodiment of the present invention, the first pipe clamp member and the second pipe clamp member are connected together by means of a fastener, so as to clamp the pipe.

The present invention further provides a heat exchanger, comprising: a first heat exchanger, the first heat exchanger comprising a first manifold; and a second heat exchanger, the second heat exchanger comprising a second manifold and an inlet/outlet pipe connected to the second manifold, the heat exchanger further comprising the pipe clamp assembly, the first mounting surface of the first pipe clamp member of the pipe clamp assembly being mounted on the first manifold of the first heat exchanger, and the inlet/outlet pipe of the second heat exchanger being clamped between the mounting surface of the second pipe clamp member and the second mounting surface of the first pipe clamp member.

According to an embodiment of the present invention, the second heat exchanger further comprises second heat exchange tubes arranged between two said second manifolds, the second heat exchanger is a multi-row heat exchanger, a plurality of said inlet/outlet pipes and a plurality of said second manifolds located at one end of the second heat exchange tubes are provided, and the plurality of inlet/outlet pipes are clamped between the mounting surface of the second pipe clamp member and the second mounting surface of the first pipe clamp member.

According to an embodiment of the present invention, the first heat exchanger and the second heat exchanger are arranged side by side in an extension direction of the first manifold and/or the second manifold, and the inlet/outlet pipe extends to a side of the first heat exchanger that is remote from the second heat exchanger.

By using the pipe clamp assembly and heat exchanger having same according to an embodiment of the present invention, for example, the manufacturing process of a heat exchanger may be simplified.

DETAILED DESCRIPTION

The present invention is explained further below in conjunction with the accompanying drawings and specific embodiments.

Figure 1A:
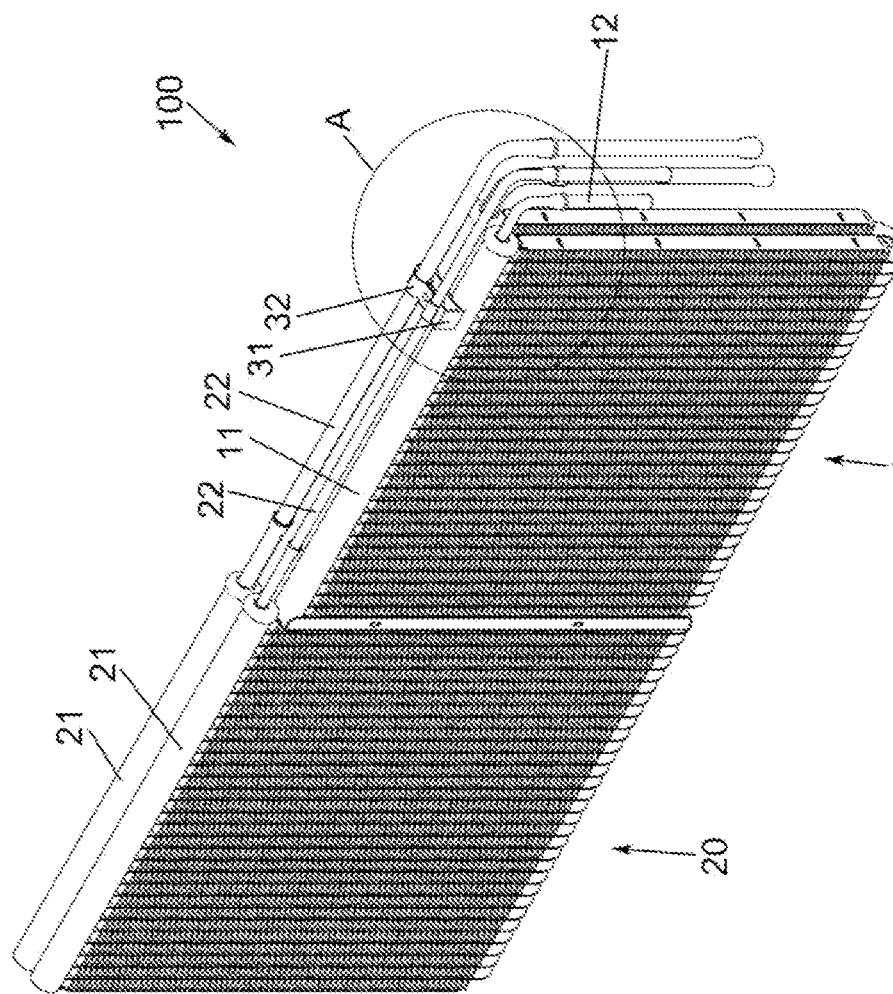
FIG. 1A is a schematic perspective view of a heat exchanger according to an embodiment of the present invention.
Figure 1B:
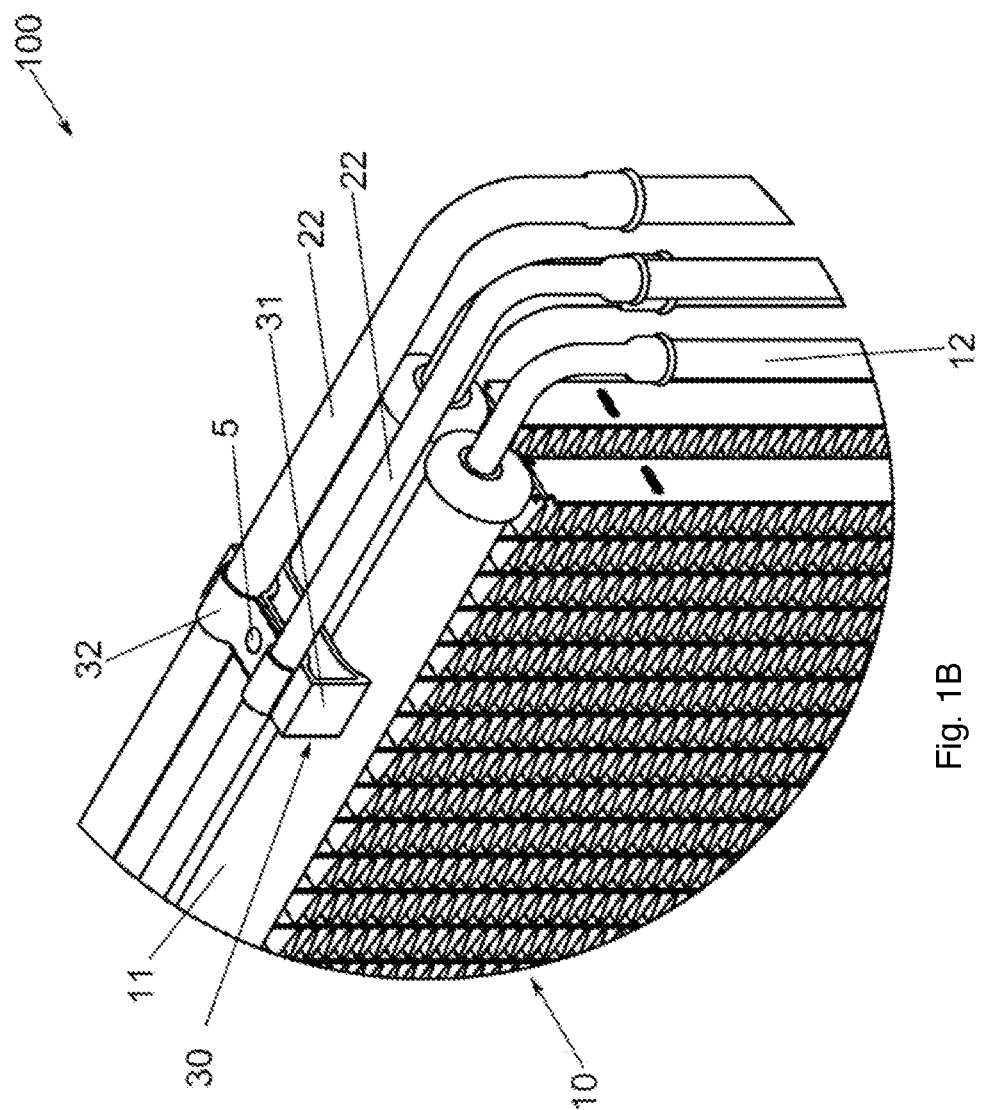
FIG. 1B is a schematic enlarged perspective view of a portion A of the heat exchanger shown in FIG. 1.
Figure 2:
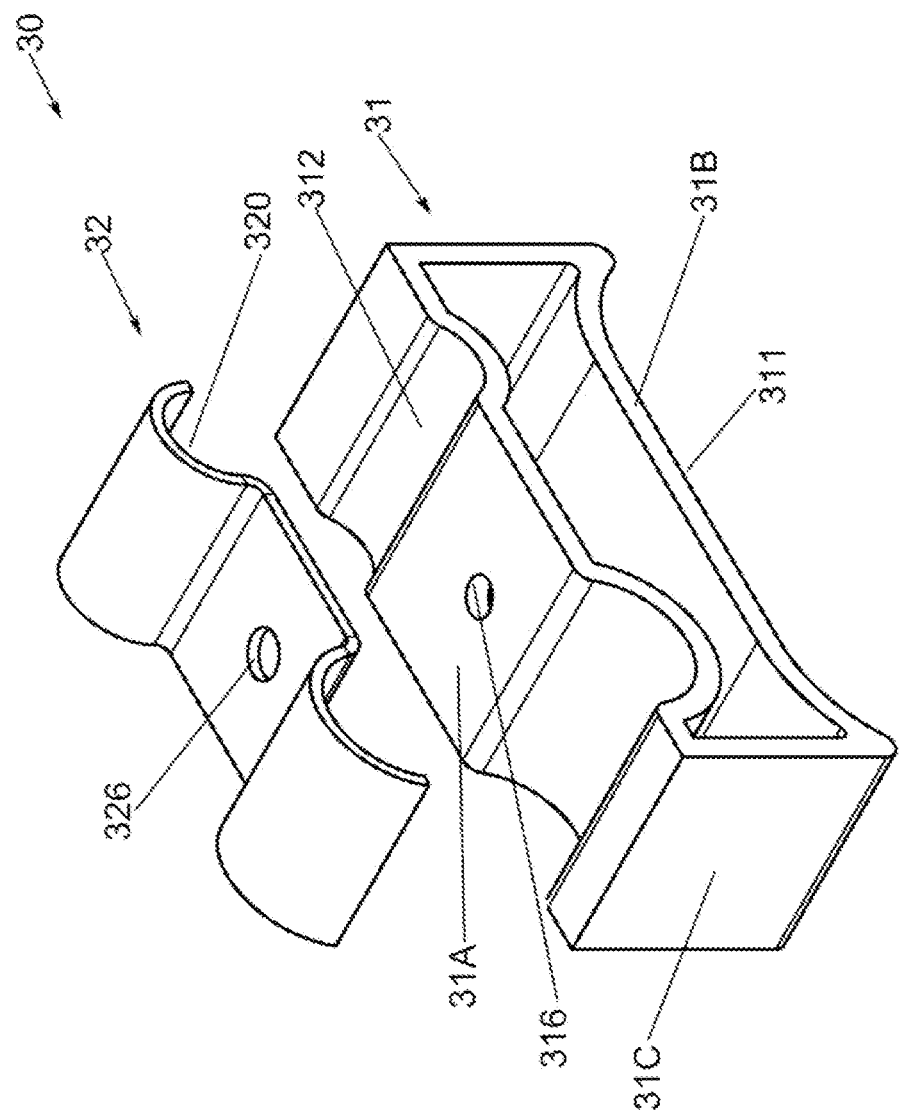
FIG. 2 is a schematic perspective view of a pipe clamp assembly according to an embodiment of the present invention.
Figure 7:
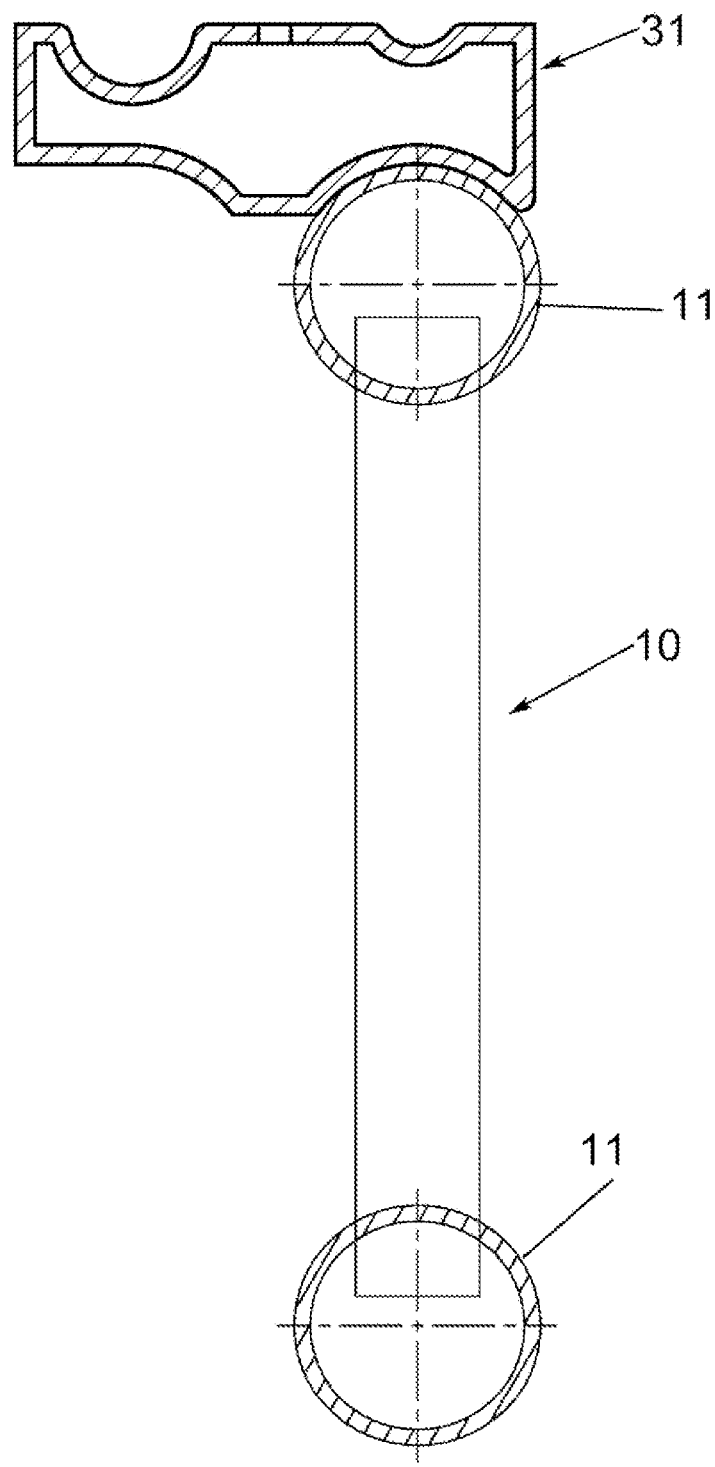
FIG. 7 is a sectional view of a first pipe clamp member of the pipe clamp assembly shown in FIG. 6 in a usage state in a step in a manufacturing process of a heat exchanger.
Figure 8:
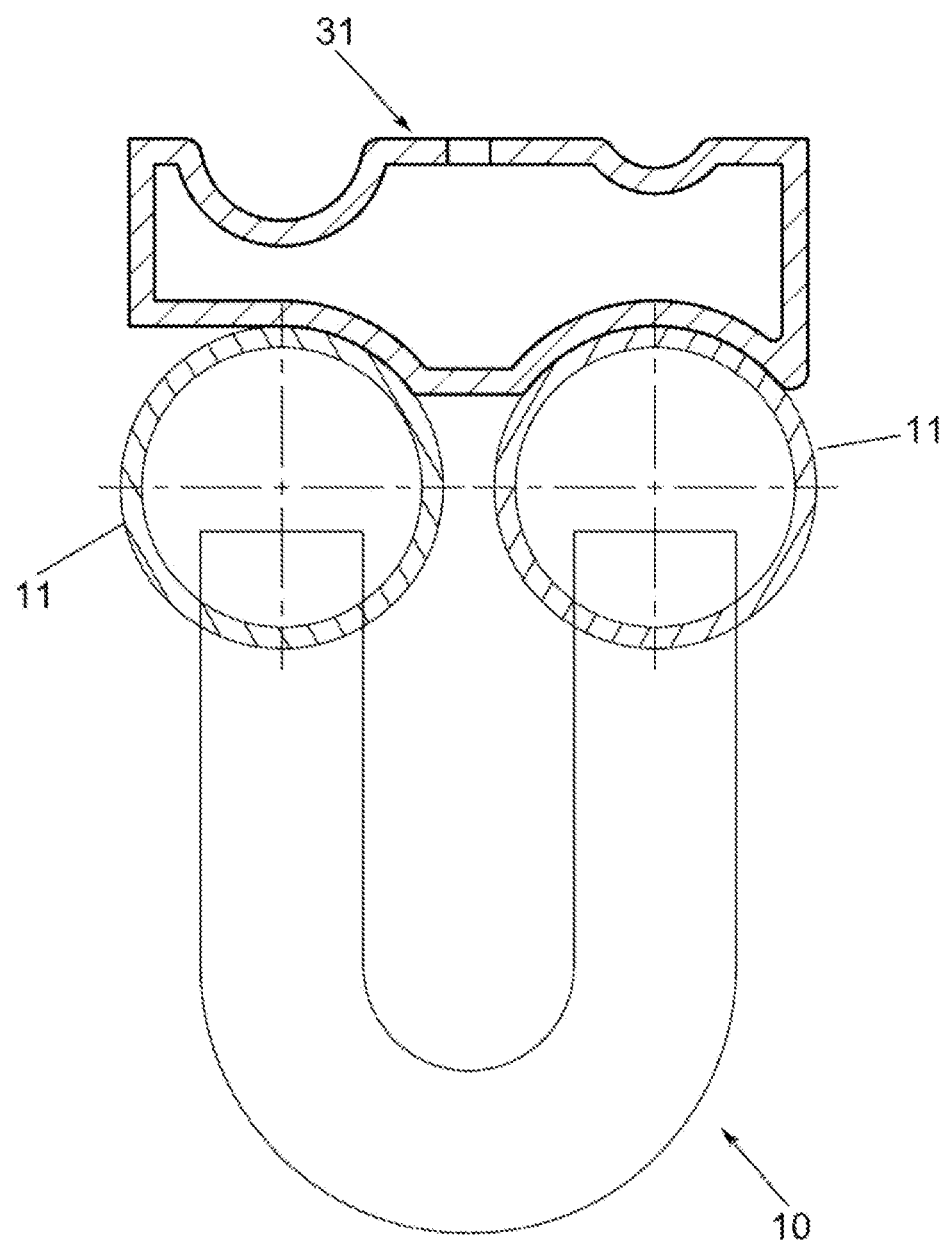
FIG. 8 is a sectional view of a first pipe clamp member of the pipe clamp assembly shown in FIG. 6 in a usage state in another step in a manufacturing process of a heat exchanger.
Figure 9:
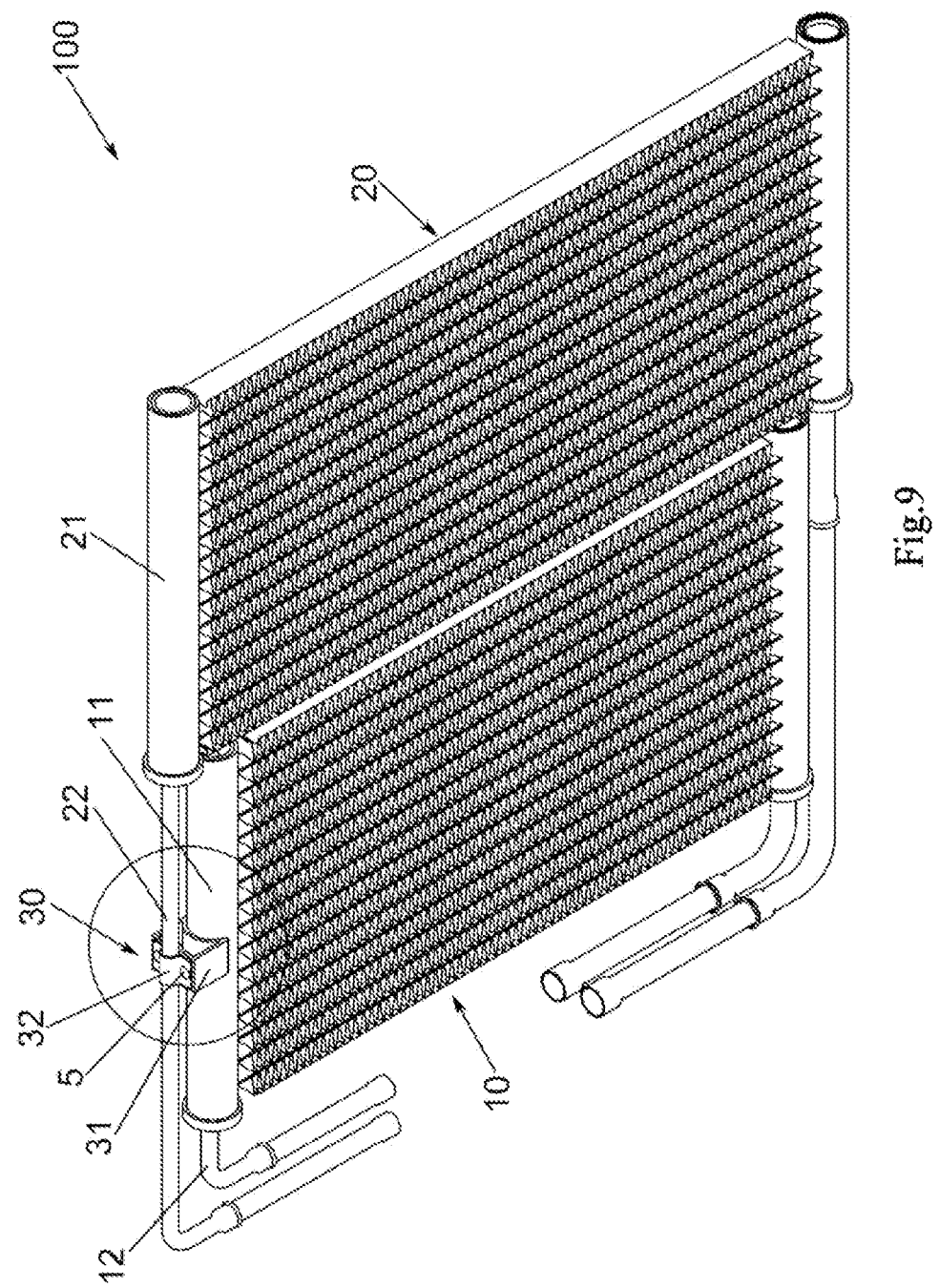
FIG. 9 is a schematic perspective view of a heat exchanger according to another embodiment of the present invention.
Figure 10:
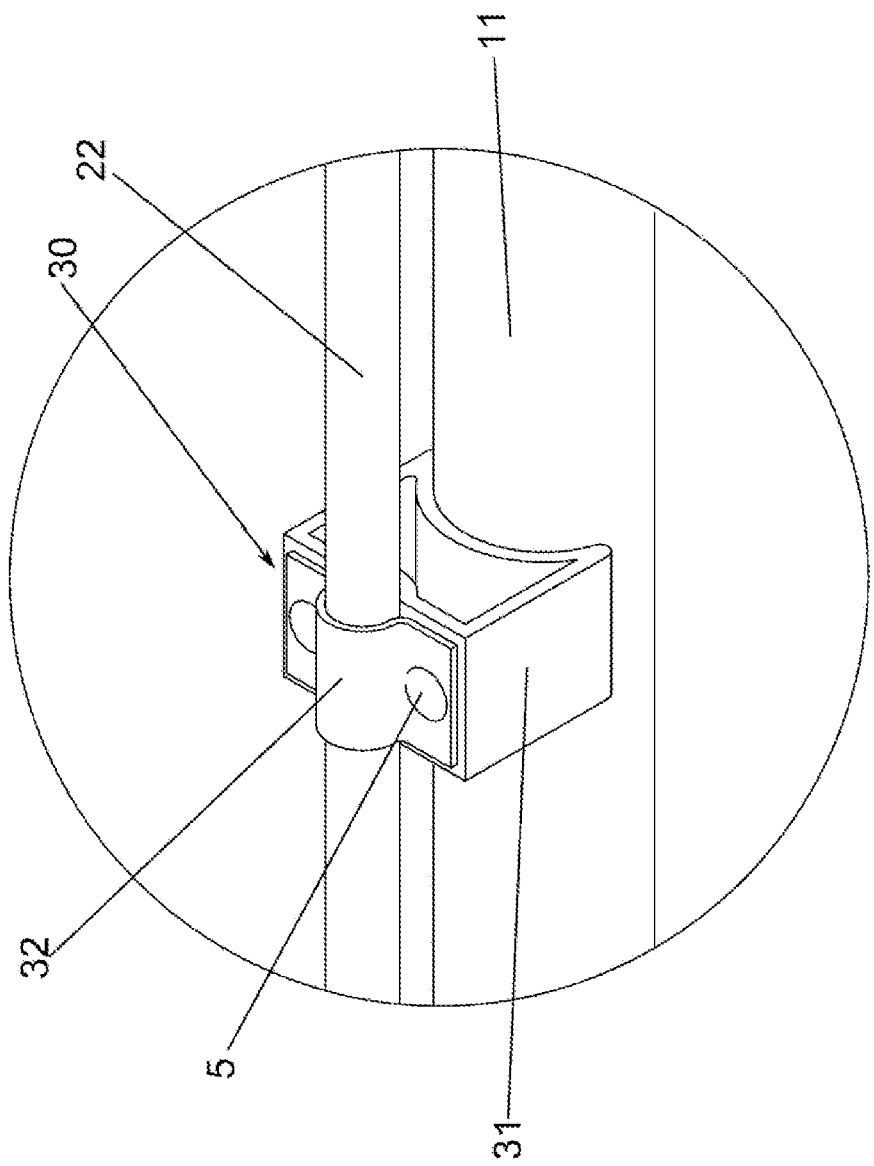
FIG. 10 is a partial enlarged schematic perspective view of the heat exchanger shown in FIG. 9, showing a usage state of a pipe clamp assembly according to another embodiment of the present invention.
Figure 11C:
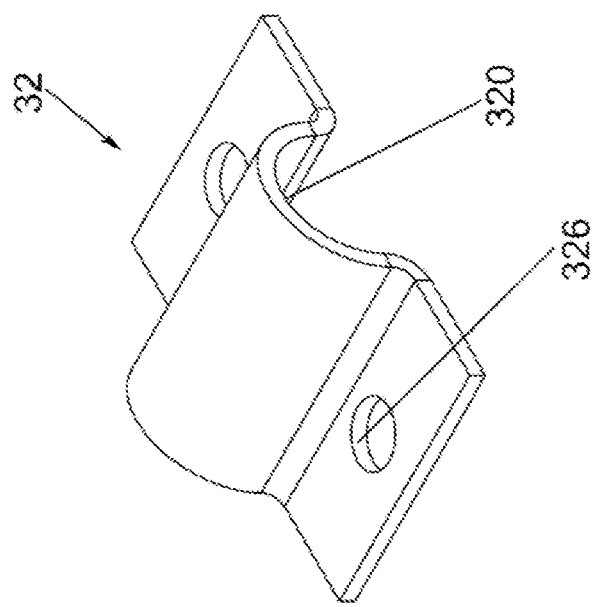
FIGS. 11A, 11B and 11C are respectively a schematic main view, schematic top view and schematic perspective view of a second pipe clamp member of the pipe clamp assembly shown in FIGS. 9 and 10.
Figure 11A:
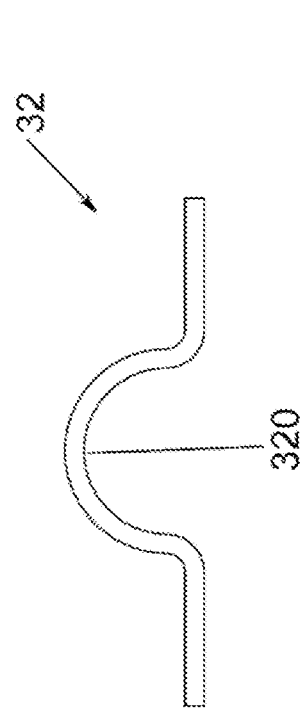
Figure 11B:
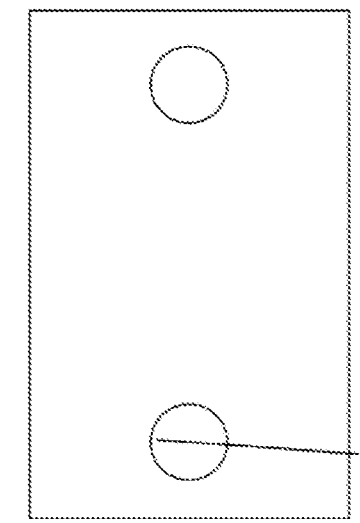
Figure 12C:
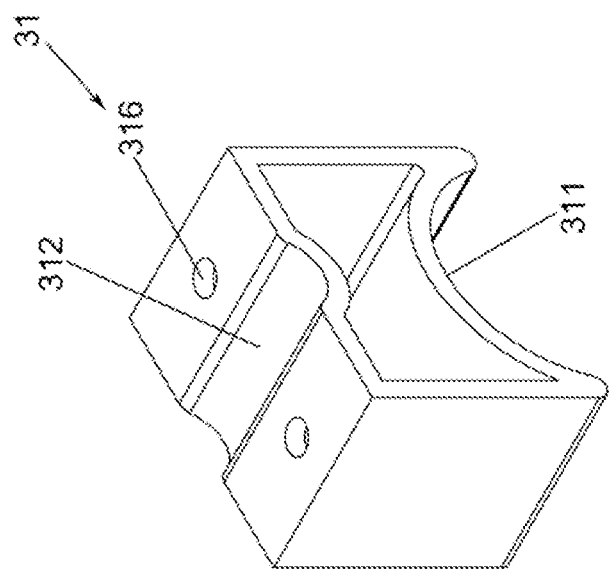
FIGS. 12A, 12B and 12C are respectively a schematic main view, schematic top view and schematic perspective view of a first pipe clamp member of the pipe clamp assembly shown in FIGS. 9 and 10.
Figure 12A:
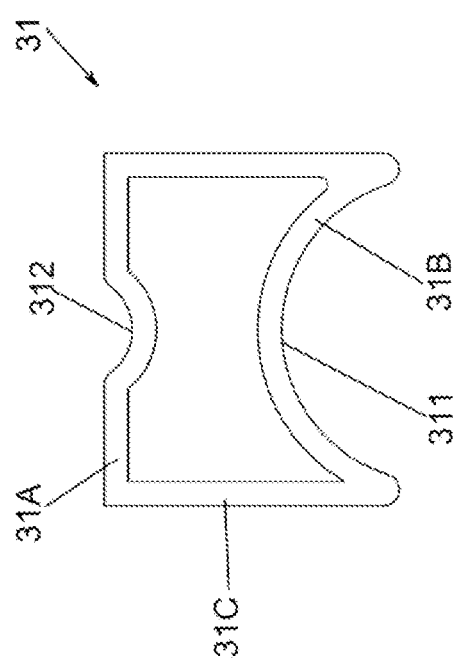
Figure 12B:
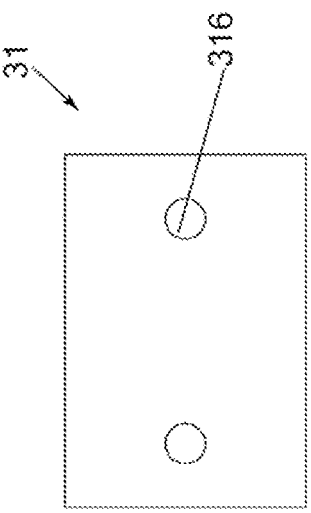

Referring to FIGS. 1A to 12C, a heat exchanger 100 according to an embodiment of the present invention comprises a first heat exchanger 10 and a second heat exchanger 20. The first heat exchanger 10 comprises two first manifolds 11, first heat exchange tubes arranged between the two first manifolds 11, first fins arranged alternately with the first heat exchange tubes, and two first inlet/outlet pipes 12 respectively connected to the two first manifolds 11 (one of the two first inlet/outlet pipes serves as a first inlet pipe and the other serves as a first outlet pipe). The two first inlet/outlet pipes may respectively be in fluid communication with distribution pipes in the two first manifolds 11. The second heat exchanger 20 comprises two second manifolds 21, second heat exchange tubes arranged between the two second manifolds 21, second fins arranged alternately with the second heat exchange tubes, and two second inlet/outlet pipes 22 respectively connected to the two second manifolds 21 (one of the two second inlet/outlet pipes serves as a second inlet pipe and the other serves as a second outlet pipe). The two second inlet/outlet pipes may respectively be in fluid communication with distribution pipes in the two second manifolds 21. The first heat exchanger 10 and the second heat exchanger 20 may be arranged side by side in an extension direction of the first manifolds 11 and/or the second manifolds 21. The second inlet/outlet pipes 22 of the second heat exchanger 20 extend to a side of the first heat exchanger 10 that is remote from the second heat exchanger 20. As shown in FIGS. 1A, 8 and 9, the first heat exchanger 10 may be a single-row heat exchanger, or may be a multi-row heat exchanger; the second heat exchanger 20 may be a single-row heat exchanger, or may be a multi-row heat exchanger. As shown in FIGS. 1 and 8, the multi-row heat exchanger may be a bent heat exchanger, and the two first manifolds 11 and the two second manifolds 21 may all be located on the same side of the heat exchanger. In other embodiments of the present invention, the multi-row heat exchanger may be composed of multiple rows of heat exchanger cores (for example multiple single-row heat exchangers), or may be a combination of a bent heat exchanger and multiple rows of heat exchanger cores. The heat exchanger 100 further comprises a pipe clamp assembly 30.

Referring to FIGS. 1A to 12C, the pipe clamp assembly 30 according to an embodiment of the present invention comprises a first pipe clamp member 31 and a second pipe clamp member 32, the first pipe clamp member 31 comprising a first mounting surface 311 located on a first side of the first pipe clamp member 31 and a second mounting surface 312 located on a second side, opposite the first side, of the first pipe clamp member 31. The second pipe clamp member 32 comprises a mounting surface 320 facing the first pipe clamp member 31, and the mounting surface 320 of the second pipe clamp member 32 and the second mounting surface 312 of the first pipe clamp member 31 are used for clamping a pipe (such as the second inlet/outlet pipe 22) between the mounting surface 320 of the second pipe clamp member 32 and the second mounting surface 312 of the first pipe clamp member 31. The second heat exchanger 21 may be a multi-row heat exchanger, a plurality of second manifolds 21 and a plurality of second inlet/outlet pipes 22 connected to the second manifolds 21 located at one end of the second heat exchange tubes are provided, and the plurality of second inlet/outlet pipes 22 are clamped between mounting surfaces 320 of the second pipe clamp member 32 and second mounting surfaces 312 of the first pipe clamp member 31.

Referring to FIG. 2 and FIGS. 11A to 12C, in an embodiment of the present invention, the first mounting surface 311 of the first pipe clamp member 31 is concave. At least a portion of the first mounting surface 311 of the first pipe clamp member 31 may have an arc shape. The second mounting surface 312 of the first pipe clamp member 31 is concave, and the mounting surface 320 of the second pipe clamp member 32 is concave. At least a portion of the second mounting surface 312 of the first pipe clamp member 31 may have an arc shape, and at least a portion of the mounting surface 320 of the second pipe clamp member 32 may have an arc shape.

Figure 4:
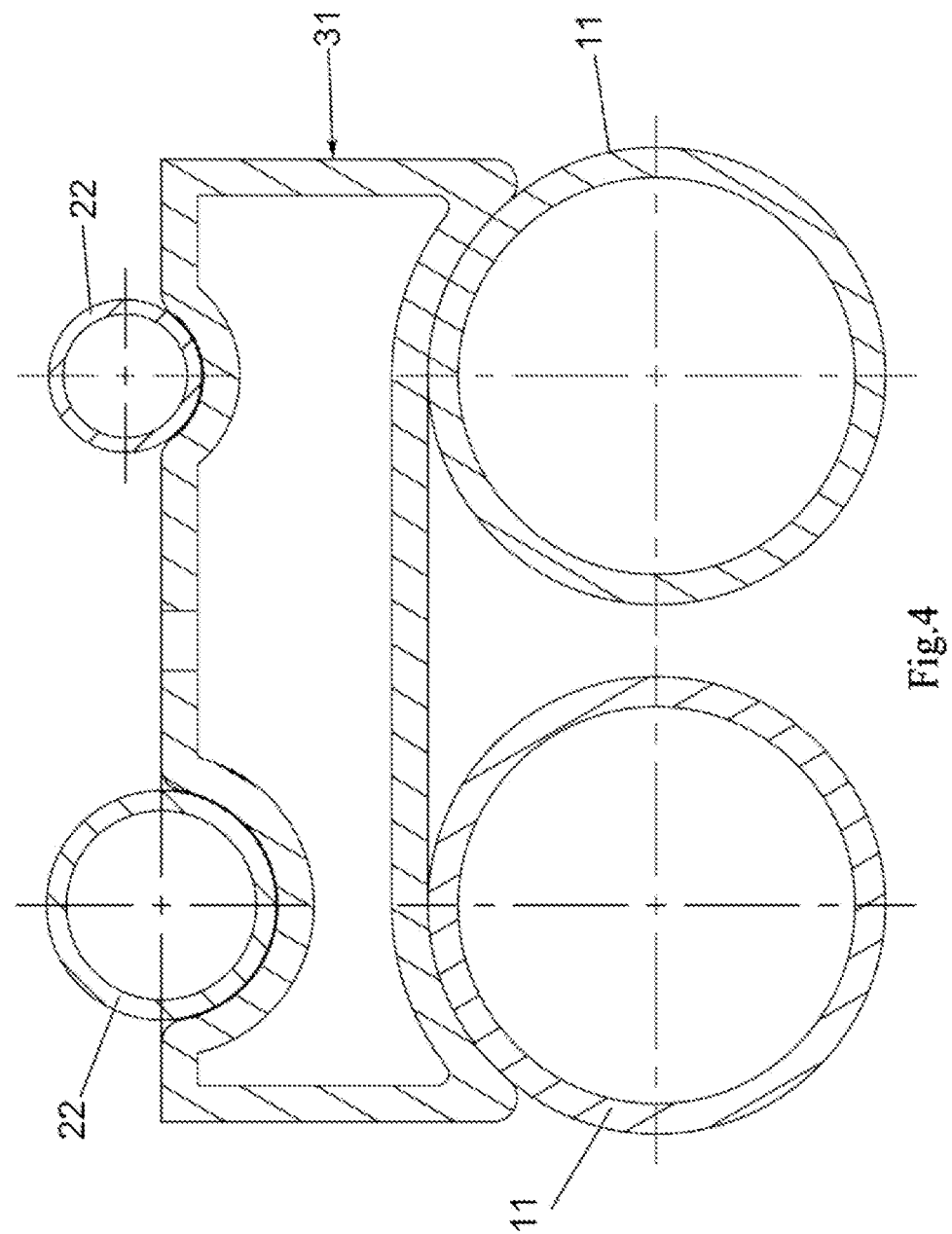
FIG. 4 is a sectional view of a first pipe clamp member of the pipe clamp assembly shown in FIG. 2 in a usage state.
Figure 5:
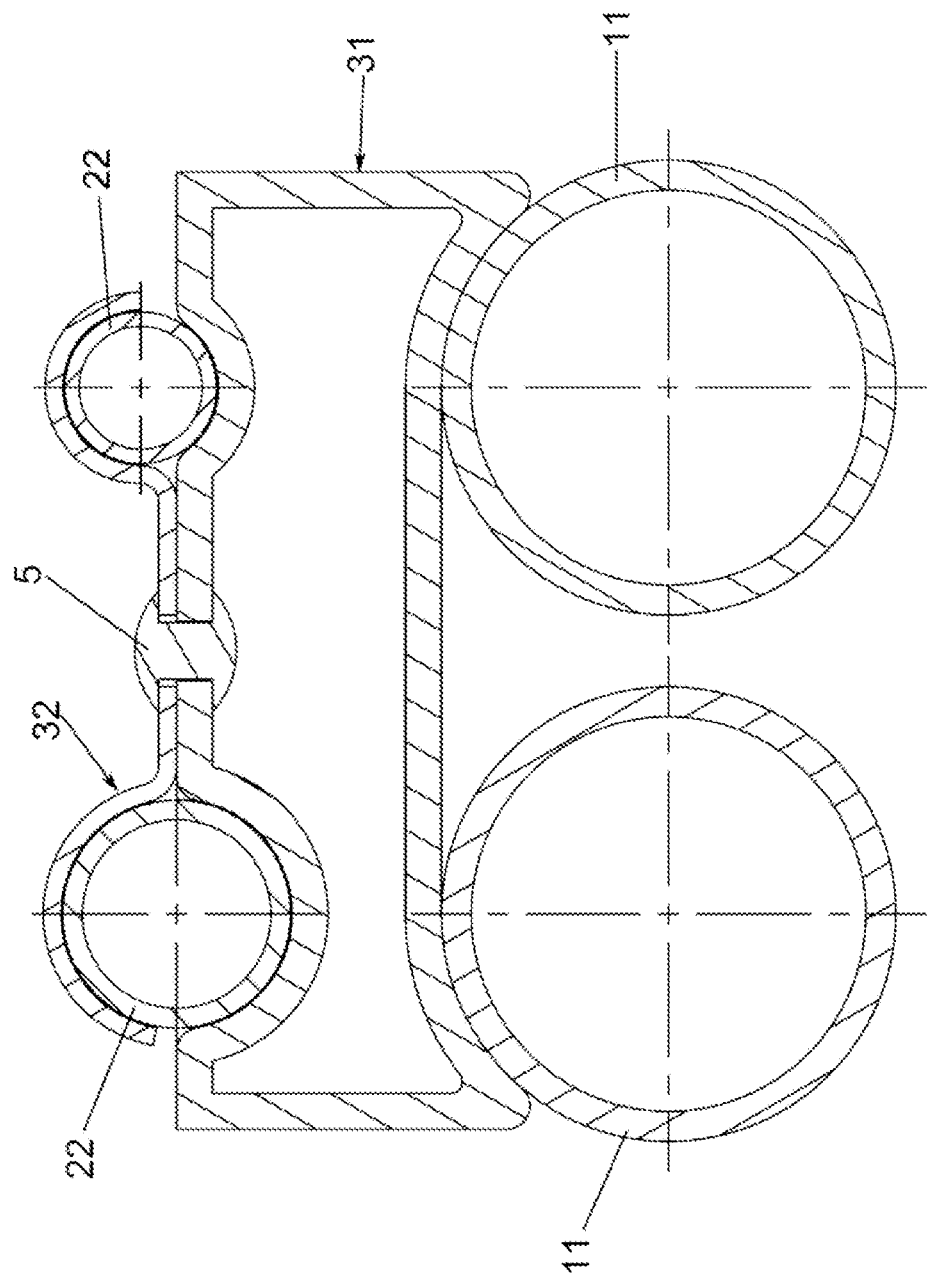
FIG. 5 is a sectional view of the pipe clamp assembly shown in FIG. 2 in a usage state.
Figure 6:
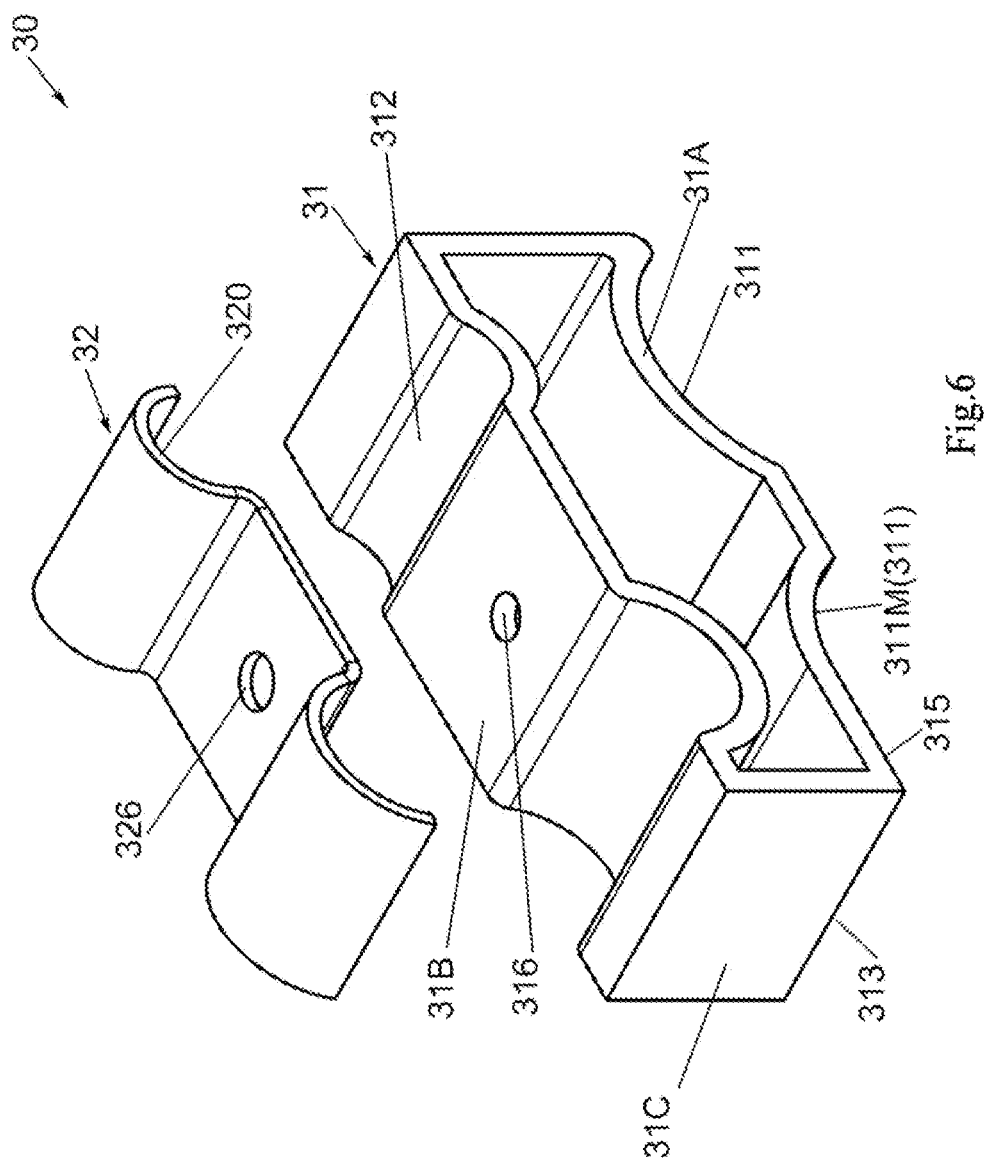
FIG. 6 is a schematic perspective view of a pipe clamp assembly according to another embodiment of the present invention.

Referring to FIGS. 1A to 12C, in an embodiment of the present invention, a first side of the first pipe clamp member 31 is opposite a second side of the first pipe clamp member 31 in a first direction, the first mounting surface 311 of the first pipe clamp member 31, the second mounting surface 312 of the first pipe clamp member 31 and the mounting surface 320 of the second pipe clamp member 32 approximately extend in a second direction perpendicular to the first direction, and, in a plane perpendicular to the second direction, at least a portion of the first mounting surface 311 of the first pipe clamp member 31 may have an arc shape, at least a portion of the second mounting surface 312 of the first pipe clamp member 31 may have an arc shape, and at least a portion of the mounting surface 320 of the second pipe clamp member 32 may have an arc shape. Referring to FIGS. 6 to 8, according to an embodiment of the present invention, the first pipe clamp member 31 comprises a plurality of said first mounting surfaces 311, the first pipe clamp member 31 further comprises an accommodating concave part 315 located on the first side of the first pipe clamp member 31, the accommodating concave part 315 extends from an edge 313, in the arrangement direction of the plurality of first mounting surfaces 311, of the first pipe clamp member 31 to the first mounting surface 311M among the plurality of first mounting surfaces 311 which is closest to the edge 313, to communicate with the first mounting surface 311M. Referring to FIGS. 1A to 8, in an embodiment of the present invention, the first pipe clamp member 31 comprises a plurality of said first mounting surfaces 311, the first pipe clamp member 31 further comprises an accommodating concave part 315 located on the first side of the first pipe clamp member 31, the accommodating concave part 315 extends in a second direction, and the accommodating concave part 315 extends from an edge 313, in a third direction (an arrangement direction) perpendicular to a first direction and the second direction, of the first pipe clamp member 31 in the third direction (the arrangement direction) to the first mounting surface 311M among the plurality of first mounting surfaces 311 which is closest to the edge 313, to communicate with the first mounting surface 311M in the third direction (the arrangement direction).

Referring to FIGS. 1A to 12C, in an embodiment of the present invention, the first pipe clamp member 31 is a hollow component formed from a plate; for example, a hollow component formed by stamping and welding a metal plate. For example, the first pipe clamp member 31 comprises a first plate 31A which defines the first mounting surface 311, a second plate 31B which defines the second mounting surface 312, and two third plates 31C which are opposite each other and connected to the first plate 31A and the second plate 31B. The second pipe clamp member 32 is a component formed from a plate; for example, the second pipe clamp member 32 is formed by stamping a metal plate. In addition, the first pipe clamp member 31 may also be a solid component.

Referring to FIGS. 1A to 12C, in a heat exchanger according to an embodiment of the present invention, the first mounting surface 311 of the first pipe clamp member 31 of the pipe clamp assembly 30 is mounted on the first manifold 11 of the first heat exchanger 10, and the second inlet/outlet pipe 22 of the second heat exchanger 20 is clamped between the mounting surface 320 of the second pipe clamp member 32 and the second mounting surface 312 of the first pipe clamp member 31.

Referring to FIGS. 1A to 12C, in an embodiment of the present invention, the first pipe clamp member 31 may be provided with a through hole 316, and the second pipe clamp member 32 may be provided with a through hole 326, so that by means of passing a fastener 5, such as a rivet, through the through hole 316 of the first pipe clamp member 31 and the through hole 326 of the second pipe clamp member 32, the first pipe clamp member 31 and the second pipe clamp member 32 are connected together, so as to clamp the second inlet/outlet pipe 22. The first mounting face 311 of the first pipe clamp member 31 may be welded or bonded to the first manifold 11 of the first heat exchanger 10, or is connected to the first manifold 11 of the first heat exchanger 10 by means of a clamping component. The first pipe clamp member 31 and the second pipe clamp member 32 may also be welded or bonded together.

By using an embodiment according to the present invention, a spot-welding procedure on an inlet/outlet pipe is avoided, simplifying an assembly process. In addition, the first mounting surface 311 of the first pipe clamp member 31 is concave; for example, at least a portion of the first mounting surface 311 of the first pipe clamp member 31 has an arc shape, which can increase the welding area or bonding area. If the first heat exchanger 10 is provided with a plurality of first manifolds, the first pipe clamp member 31 may be welded to all of the first manifolds or may be welded only to some of the first manifolds. When two first manifolds are not aligned, the first mounting surface 311 of the first pipe clamp member 31 might not match one first manifold; the first pipe clamp member 31 may merely be provided with a corresponding first mounting surface 311 and then the pipe clamp assembly can still be used.

Figure 3:
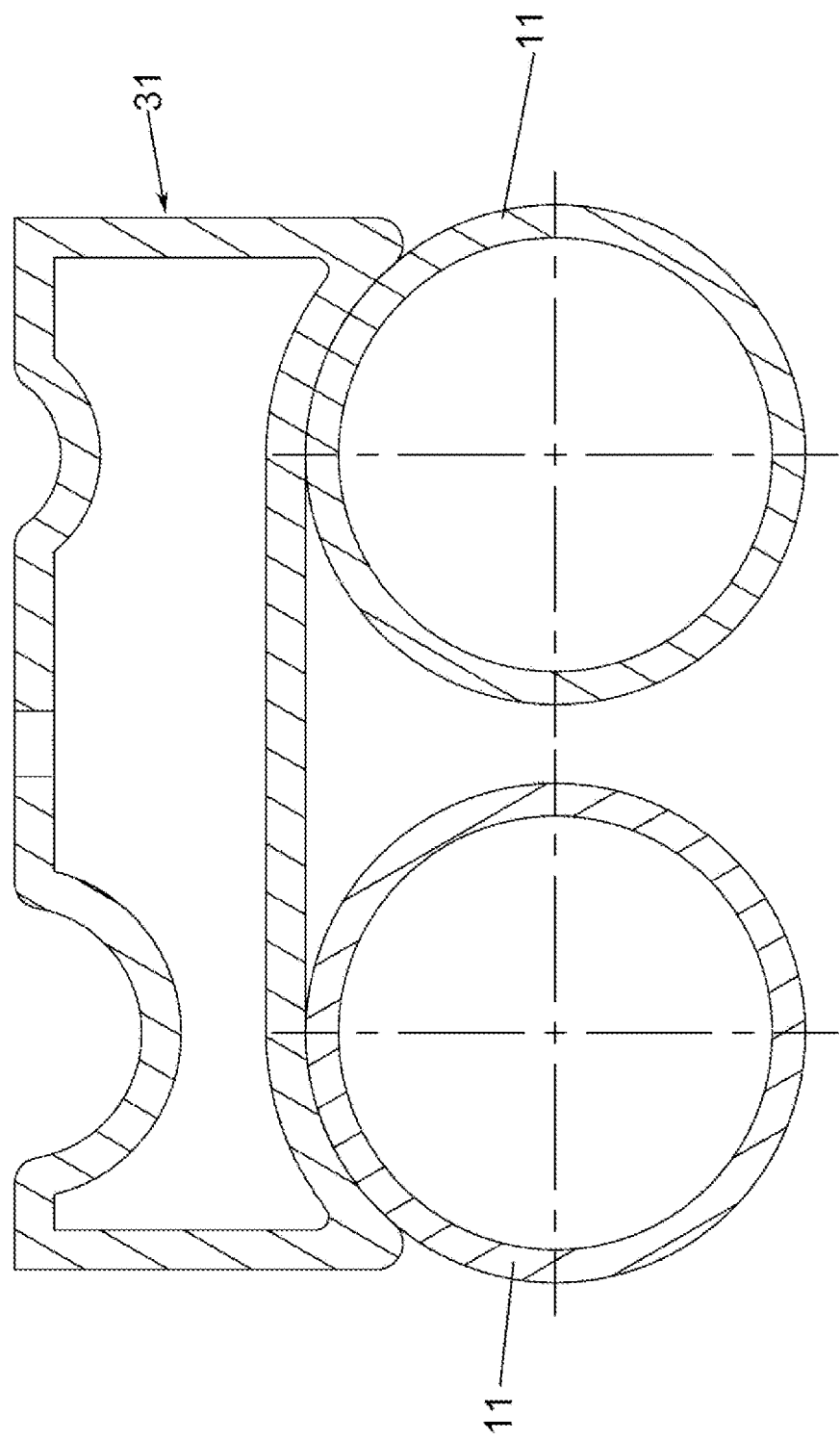
FIG. 3 is a sectional view of a first pipe clamp member of the pipe clamp assembly shown in FIG. 2 in a usage state.

An assembly method for the heat exchanger according to an embodiment of the present invention is described below. As shown in FIG. 3, first the first pipe clamp member 31 is placed on the first manifolds 11 of the first heat exchanger 10, the first mounting surface 311 comes into contact with the first manifolds 11, and the first pipe clamp member 31 is spot-welded to the first manifolds 11 of the first heat exchanger 10; as shown in FIG. 4, the second heat exchanger 20 is mounted, and the second inlet/outlet pipes 22 of the second heat exchanger 20 are placed on the second mounting surfaces 312 of the first pipe clamp member 31; next, as shown in FIG. 5, the second pipe clamp member 32 is placed, and the mounting surfaces 320 of the second pipe clamp member 32 come into contact with the second inlet/outlet pipes 22, and the fastener 5 is used to fix the first pipe clamp member 31 and the second pipe clamp member 32 together.

An assembly method for the heat exchanger according to another embodiment of the present invention is described below. As shown in FIG. 7, first the first pipe clamp member 31 is placed on a first manifold 11 of the first heat exchanger 10, the first mounting surface 311 comes into contact with the first manifold 11, and the first pipe clamp member 31 is spot-welded to the first manifold 11 of the first heat exchanger 10; as shown in FIG. 8, the first heat exchanger 10 is bent, and the first pipe clamp member 31 is spot-welded to another first manifold 11 of the first heat exchanger 10; as shown in FIG. 4, the second heat exchanger 20 is mounted, and the second inlet/outlet pipes 22 of the second heat exchanger 20 are placed on the second mounting surfaces 312 of the first pipe clamp member 31; next, as shown in FIG. 5, the second pipe clamp member 32 is placed, and the mounting surfaces 320 of the second pipe clamp member 32 come into contact with the second inlet/outlet pipes 22, and the fastener 5 is used to fix the first pipe clamp member 31 and the second pipe clamp member 32 together.

According to an embodiment of the present invention, an accommodating concave part 315 extends from an edge 313 of the first pipe clamp member 31 to a first mounting surface 311M, to communicate with the first mounting surface 311M. Thus, after the second heat exchanger 20 has been bent, it is easy to fit the second manifold 2 in the first mounting surface 311M.

According to an embodiment of the present invention, the first pipe clamp member 31 may also have one first mounting surface 311 and one second mounting surface 312 (as shown in FIGS. 9 to 12).

By using the pipe clamp assembly and heat exchanger having same according to an embodiment of the present invention, for example, the manufacturing process of a heat exchanger may be simplified.

In addition, by using the pipe clamp assembly and heat exchanger having same according to an embodiment of the present invention, the risk of the distribution pipe being scrapped due to puncturing from spot-welding and the risk of later failure due to damage of the distribution pipe from spot-welding are both avoided, and welding spots of the inlet/outlet pipe falling off due to vibrations after operating over a long time may be prevented, and thus the service life is prolonged. In addition, the pipe clamp assembly and heat exchanger having same according to an embodiment of the present invention are simply mounted and easily implemented.

Although a specific application of the pipe clamp assembly 30 has been described in the above embodiments, the pipe clamp assembly 30 may also be used for a heat exchanger of another type or used for fixing a tubular member of another device.

Although the above embodiments have been described, certain features in the above embodiments can be combined to form new embodiments.

The invention claimed is:

1. A pipe clamp assembly comprising:
   a first pipe clamp member, the first pipe clamp member comprising a first mounting surface located on a first side of the first pipe clamp member and a second mounting surface located on a second side, the second mounting surface facing in an opposite direction from the first mounting surface, of the first pipe clamp member; and
   a second pipe clamp member, the second pipe clamp member comprising a mounting surface facing the first pipe clamp member, and the mounting surface of the second pipe clamp member and the second mounting surface of the first pipe clamp member being used for clamping a pipe between the mounting surface of the second pipe clamp member and the second mounting surface of the first pipe clamp member;
   wherein at least one portion of the first mounting surface of the first pipe clamp member is concave and the at least one concave portion of the first mounting surface is configured to contact a manifold of a heat exchanger.

2. The pipe clamp assembly as claimed in claim 1, wherein:
   at least a portion of the first mounting surface of the first pipe clamp member has an arc shape.

3. The pipe clamp assembly as claimed in claim 1, wherein:
   the second mounting surface of the first pipe clamp member is concave, and the mounting surface of the second pipe clamp member is concave.

4. The pipe clamp assembly as claimed in claim 3, wherein:
   at least a portion of the second mounting surface of the first pipe clamp member has an arc shape, and at least a portion of the mounting surface of the second pipe clamp member has an arc shape.

5. The pipe clamp assembly as claimed in claim 1, wherein:
   the first pipe clamp member comprises a plurality of said first mounting surfaces, the first pipe clamp member further comprises an accommodating concave part located on the first side of the first pipe clamp member, and the accommodating concave part extends from an edge, in the arrangement direction of the plurality of first mounting surfaces, of the first pipe clamp member to one first mounting surface among the plurality of first mounting surfaces which is closest to the edge, to communicate with said one first mounting surface.

6. A pipe clamp assembly comprising:
   a first pipe clamp member, the first pipe clamp member comprising a first mounting surface located on a first side of the first pipe clamp member and a second mounting surface located on a second side, the second mounting surface facing in an opposite direction from the first mounting surface, of the first pipe clamp member; and
   a second pipe clamp member, the second pipe clamp member comprising a mounting surface facing the first pipe clamp member, and the mounting surface of the second pipe clamp member and the second mounting surface of the first pipe clamp member being used for clamping a pipe between the mounting surface of the second pipe clamp member and the second mounting surface of the first pipe clamp member, wherein:
   the first pipe clamp member is a hollow component formed from a plate.

7. The pipe clamp assembly as claimed in claim 6, wherein:
   the first pipe clamp member comprises a first plate which defines the first mounting surface, a second plate which defines the second mounting surface, and two third plates which are opposite each other and connected to the first plate and the second plate.

8. The pipe clamp assembly as claimed in claim 1, wherein:
   the second pipe clamp member is a component formed from a plate.

9. The pipe clamp assembly as claimed in claim 1, wherein:
   the first pipe clamp member and the second pipe clamp member are connected together by means of a fastener, so as to clamp the pipe.

10. A heat exchanger, comprising:
    a first heat exchanger, the first heat exchanger comprising a first manifold;
    a second heat exchanger, the second heat exchanger comprising a second manifold, and an inlet/outlet pipe connected to the second manifold;
    a first pipe clamp member, the first pipe clamp member comprising a first mounting surface located on a first side of the first pipe clamp member and a second mounting surface located on a second side, the second mounting surface facing in an opposite direction from the first mounting surface, of the first pipe clamp member; and
    a second pipe clamp member, the second pipe clamp member comprising a mounting surface facing the first pipe clamp member, and the mounting surface of the second pipe clamp member and the second mounting surface of the first pipe clamp member being used for clamping a pipe between the mounting surface of the second pipe clamp member and the second mounting surface of the first pipe clamp member,
    wherein the first mounting surface of the first pipe clamp member of the pipe clamp assembly is mounted on and contacts the first manifold of the first heat exchanger, and the inlet/outlet pipe of the second heat exchanger is clamped between the mounting surface of the second pipe clamp member and the second mounting surface of the first pipe clamp member.

11. The heat exchanger as claimed in claim 10, wherein:
    the second heat exchanger is a multi-row heat exchanger further comprising second heat exchange tubes arranged between said second manifold and an additional second manifold, and an additional inlet/outlet pipe connected to the additional second manifold, said second manifold and said additional second manifold are located at one end of the second heat exchange tubes, and said inlet/outlet pipe and said additional inlet/outlet pipe are clamped between the mounting surface of the second pipe clamp member and the second mounting surface of the first pipe clamp member.

12. A heat exchanger, comprising:
a first heat exchanger, the first heat exchanger comprising a first manifold;
a second heat exchanger, the second heat exchanger comprising a second manifold, and an inlet/outlet pipe connected to the second manifold;
a first pipe clamp member, the first pipe clamp member comprising a first mounting surface located on a first side of the first pipe clamp member and a second mounting surface located on a second side, the second mounting surface facing in an opposite direction from the first mounting surface, of the first pipe clamp member; and
a second pipe clamp member, the second pipe clamp member comprising a mounting surface facing the first pipe clamp member, and the mounting surface of the second pipe clamp member and the second mounting surface of the first pipe clamp member being used for clamping a pipe between the mounting surface of the second pipe clamp member and the second mounting surface of the first pipe clamp member,
wherein the first mounting surface of the first pipe clamp member of the pipe clamp assembly is mounted on the first manifold of the first heat exchanger, and the inlet/outlet pipe of the second heat exchanger is clamped between the mounting surface of the second pipe clamp member and the second mounting surface of the first pipe clamp member, and
wherein the first heat exchanger and the second heat exchanger are arranged side by side in an extension direction of the first manifold and/or the second manifold, and the inlet/outlet pipe extends to a side of the first heat exchanger that is remote from the second heat exchanger.

13. The pipe clamp assembly as claimed in claim 2, wherein:
the first pipe clamp member comprises a plurality of said first mounting surfaces, the first pipe clamp member further comprises an accommodating concave part located on the first side of the first pipe clamp member, and the accommodating concave part extends from an edge, in the arrangement direction of the plurality of first mounting surfaces, of the first pipe clamp member to one first mounting surface among the plurality of first mounting surfaces which is closest to the edge, to communicate with said one first mounting surface.

14. A heat exchanger, comprising:
a first heat exchanger, the first heat exchanger comprising a first manifold; and
a second heat exchanger, the second heat exchanger comprising a second manifold, and an inlet/outlet pipe connected to the second manifold,
wherein the heat exchanger further comprises the pipe clamp assembly as claimed in claim 1, the first mounting surface of the first pipe clamp member of the pipe clamp assembly is mounted on the first manifold of the first heat exchanger, and the inlet/outlet pipe of the second heat exchanger is clamped between the mounting surface of the second pipe clamp member and the second mounting surface of the first pipe clamp member.

15. A heat exchanger, comprising:
a first heat exchanger, the first heat exchanger comprising a first manifold; and
a second heat exchanger, the second heat exchanger comprising a second manifold, and an inlet/outlet pipe connected to the second manifold,
wherein the heat exchanger further comprises the pipe clamp assembly as claimed in claim 2, the first mounting surface of the first pipe clamp member of the pipe clamp assembly is mounted on the first manifold of the first heat exchanger, and the inlet/outlet pipe of the second heat exchanger is clamped between the mounting surface of the second pipe clamp member and the second mounting surface of the first pipe clamp member.

16. A heat exchanger, comprising:
a first heat exchanger, the first heat exchanger comprising a first manifold; and
a second heat exchanger, the second heat exchanger comprising a second manifold, and an inlet/outlet pipe connected to the second manifold,
wherein the heat exchanger further comprises the pipe clamp assembly as claimed in claim 3, the first mounting surface of the first pipe clamp member of the pipe clamp assembly is mounted on the first manifold of the first heat exchanger, and the inlet/outlet pipe of the second heat exchanger is clamped between the mounting surface of the second pipe clamp member and the second mounting surface of the first pipe clamp member.

17. A heat exchanger, comprising:
a first heat exchanger, the first heat exchanger comprising a first manifold; and
a second heat exchanger, the second heat exchanger comprising a second manifold, and an inlet/outlet pipe connected to the second manifold,
wherein the heat exchanger further comprises the pipe clamp assembly as claimed in claim 4, the first mounting surface of the first pipe clamp member of the pipe clamp assembly is mounted on the first manifold of the first heat exchanger, and the inlet/outlet pipe of the second heat exchanger is clamped between the mounting surface of the second pipe clamp member and the second mounting surface of the first pipe clamp member.

18. A heat exchanger, comprising:
a first heat exchanger, the first heat exchanger comprising a first manifold; and
a second heat exchanger, the second heat exchanger comprising a second manifold, and an inlet/outlet pipe connected to the second manifold,
wherein the heat exchanger further comprises the pipe clamp assembly as claimed in claim 5, the first mounting surface of the first pipe clamp member of the pipe clamp assembly is mounted on the first manifold of the first heat exchanger, and the inlet/outlet pipe of the second heat exchanger is clamped between the mounting surface of the second pipe clamp member and the second mounting surface of the first pipe clamp member.

19. A heat exchanger, comprising:
a first heat exchanger, the first heat exchanger comprising a first manifold; and
a second heat exchanger, the second heat exchanger comprising a second manifold, and an inlet/outlet pipe connected to the second manifold,
wherein the heat exchanger further comprises the pipe clamp assembly as claimed in claim 6, the first mounting surface of the first pipe clamp member of the pipe clamp assembly is mounted on the first manifold of the first heat exchanger, and the inlet/outlet pipe of the second heat exchanger is clamped between the mounting surface of the second pipe clamp member and the second mounting surface of the first pipe clamp member.

* * * * *